United States Patent Office 3,195,473
Patented July 20, 1965

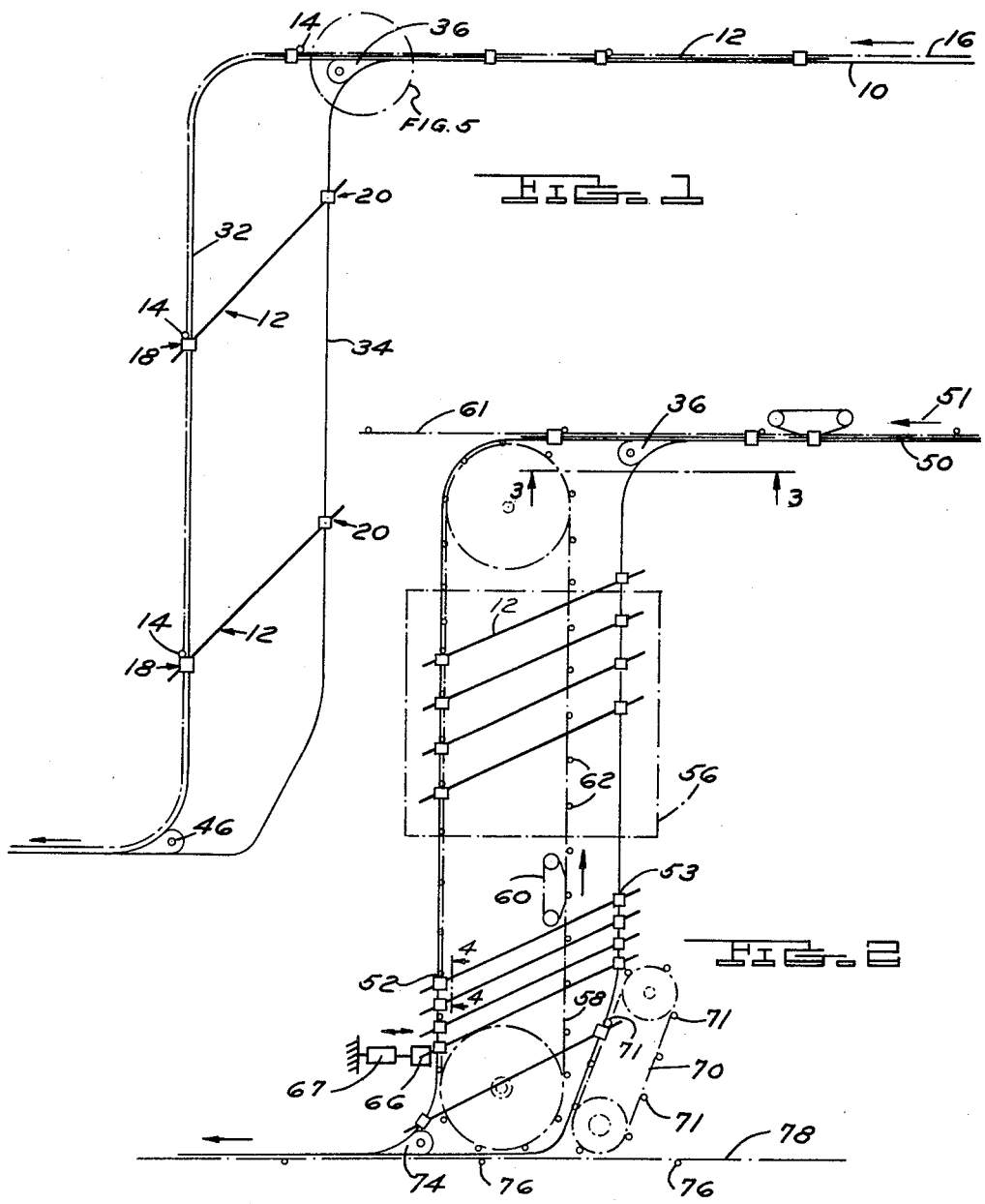

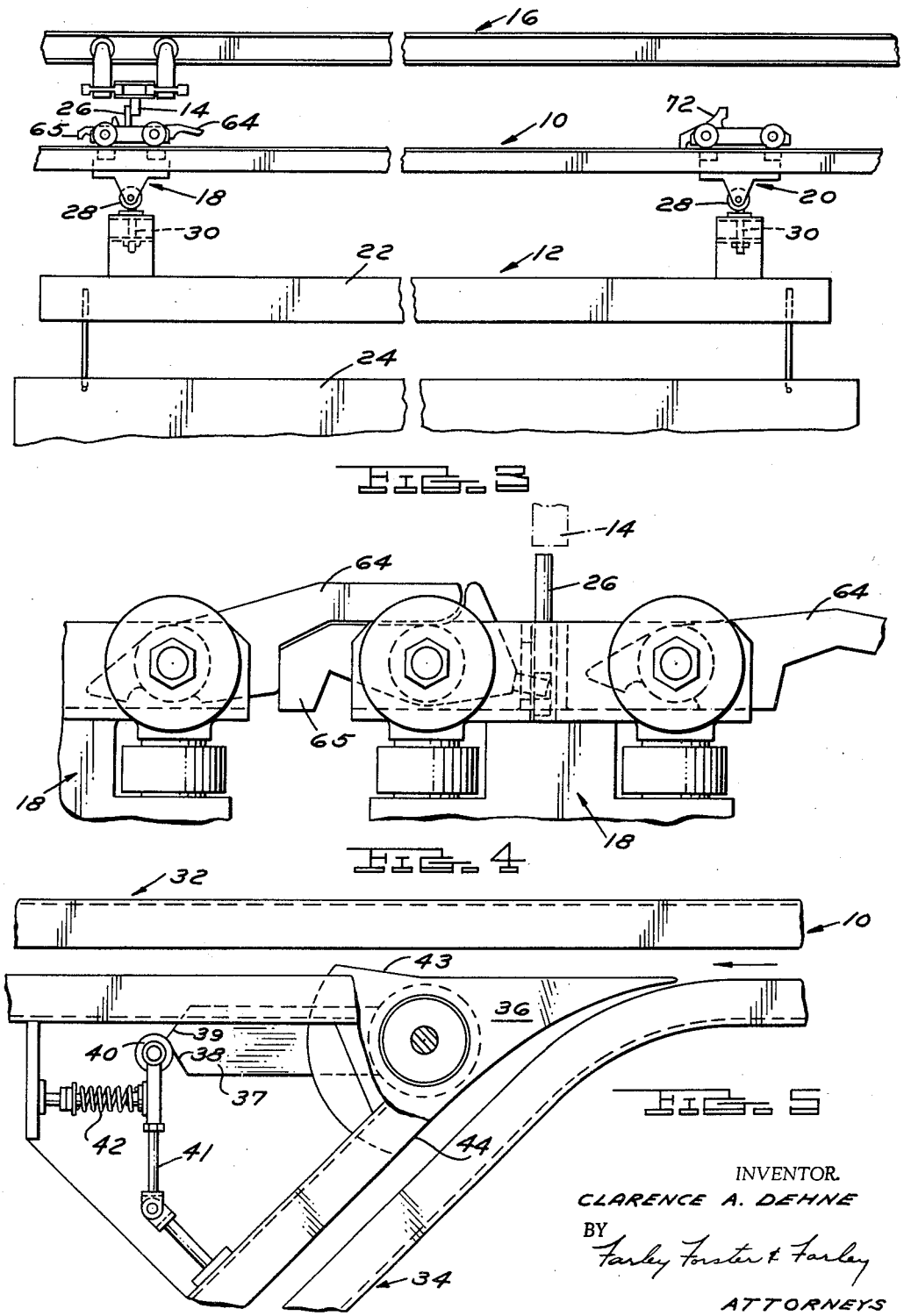

3,195,473
CONVEYOR SYSTEMS WITH SINGLE AND
DOUBLE LOAD CARRIER TRACKS
Clarence A. Dehne, Garden City, Mich., assignor to Jervis B. Webb Company, Detroit, Mich., a corporation of Michigan
Filed Aug. 5, 1963, Ser. No. 299,864
3 Claims. (Cl. 104—91)

This invention relates to improvements in conveyor systems of the Power and Free type equipped with carriers for handling elongated loads which require each carrier to be provided with a front trolley and a rear trolley connected together by suitable structure from which the load is supported. A main power line equipped with pushers propels the carriers along the load supporting track in spaced end-to-end relation.

The present invention permits the relation between adjacent carriers to be changed from end-to-end to side-by-side along any portion of the system as desired. Such a change in relation may be desirable for example, in order to permit some operation to be performed on either or both ends of a load; to permit carriers to be banked together in closely spaced relation for storage; or to permit the carriers to be grouped in side-by-side relation while the loads are passing through some processing operation such as an oven, thereby greatly reducing the length of conveyor required for the processing of a given number of loads at one time.

According to the invention a conveyor system in which load carriers are each supported from a main load track by spaced front and rear trolleys for travel in end-to-end relation propelled by pushers of a main power line is characterized by means for permitting the carriers to travel along a portion of the system in side-by-side relation comprising separate front trolley and rear trolley load tracks extending from the main track in parallel spaced relation along said portion of the system, the spaced relation between said separate tracks being less than the spacing between the front and rear trolleys of a carrier, and a switch zone at the entrance to said portion of the system, the switch zone including means for diverting the front trolley of a carrier onto the separate front trolley track and the rear trolley of the same carrier onto the separate rear trolley track.

Other features of the invention include the provision of means for propelling the carriers in side-by-side relation along that portion of the system in decreased spaced relation; means for accumulating carriers in side-by-side relation in a bank; and means for propelling the carriers in side-by-side relation by pusher members which may engage either the front or the rear trolley of a carrier.

Representative embodiments of the invention are shown in the accompanying drawings which consist of the following views:

FIGURE 1, a schematic plan view of a portion of a conveyor system;

FIGURE 2, a schematic plan view of a portion of a conveyor system, showing a different type of arrangement;

FIGURE 3, a side elevation taken as indicated by the line 3—3 of FIG. 2 showing a representative carrier construction;

FIGURE 4, an enlarged side elevation taken as indicated by the line 4—4 of FIG. 2; and FIGURE 5, an enlarged plan view of the switch zone encircled on FIG. 1.

Referring to FIGS. 1 and 3, a portion of a power and free conveyor system is shown consisting of a main load track 10 along which carriers 12 travel in conventional end-to-end relation propelled by a pusher member 14 of a main power line 16. A representative carrier construction shown in FIG. 3 includes a front trolley 18 and a rear trolley 20 connected in longitudinally spaced relation by a load bar 22 from which an elongated load 24 is suspended. The front trolley 18 is equipped with a driving dog 26 for engagement by a pusher 14 of the main power line, and each of the trolleys 18 and 20 is connected to the load bar 22 for relative articulation on a transverse horizontal axis 28 and vertical axis 30.

The system shown in FIG. 1 includes a portion along which the carriers travel in side-by-side relation, this portion being provided with a separate track 32 for the front trolleys 18 of each carrier and a separate track 34 for the rear trolleys 20 of each carrier, the tracks 32 and 34 being arranged in parallel relation spaced apart a distance less than the distance between the front trolley 18 and rear trolley 20 of a carrier. A switch is provided at the entrance to this side-by-side portion of the system and, as shown in FIG. 5, this switch includes a freely pivoted tongue 36 having an operating arm 37 secured thereto, the outer end of the arm being provided with a pair of cam surfaces 38 and 39. A roller follower 40 mounted on an arm 41 is urged into engagement with the cam surfaces 38–39 by a spring 42. Trolley engaging surfaces 43 and 44 are provided on each side of the switch tongue 36 and as a result, with the switch tongue in the position shown in FIG. 5, a passing front trolley of a carrier will move onto the front trolley track 32 and in passing will engage the tongue side surface 43 initiating movement of the switch tongue to the opposite position, this movement being augmented by action of the roller follower 40 engaging the cam surface 39. The rear trolley of the carrier is thus diverted onto the rear trolley track 34, and when passing through the switch engages the side surface 44 thereof to initiate opposite pivotal movement of the switch tongue. An automatic flip-flop action of the switch tongue is produced by the trolleys of each passing carrier, and all carrier front trolleys pass onto the separate front trolley track 32, all rear trolleys onto the separate rear trolley track 34 and the carriers travel along the separate tracks in side-by-side relation which may be desired in order to permit operations to be performed on the ends of the loads 24 supported thereby.

Power for propelling the carriers along the side-by-side portion of this system in FIG. 1 is supplied by the main power line 16. At the end of the side-by-side portion of the system a junction is provided between the front and rear trolley tracks 32 and 34 for returning the carriers to an end-to-end relation. A freely pivoted switch 46 is installed at this junction.

FIGURE 2 illustrates the application of the invention to a processing operation. For example, carriers travelling on the main line 50 in the direction of the arrow 51 have just passed a station where their loads 24 have been painted and it is desired to now pass the carriers through an oven for baking and drying the paint.

Appreciable space savings can be achieved by providing a side-by-side portion of the system for this processing operation, and as shown in FIG. 2, separate front and rear trolley tracks 52 and 53 are employed, these tracks being spaced apart as before a distance less than the spacing between the front and rear trolleys 18 and 20 of a carrier and being joined with the main track 50 by a switch 36 similar to that previously described. An oven 56 is installed along the double tracks 52–53.

Carriers are moved along the double tracks 52 and 53 by a separate power line 58 driven by a separate drive unit 60 or mechanically from the main power line 61; and in the construction shown, a very close spacing between carriers is obtained by the provision of closely spaced pushers 62 on the power line 58 and by employing a releasing dog type front trolley on each carrier. This releasing dog trolley construction permits a plurality of carriers to be accumulated in closely spaced side-by-side relation and consists of a rearwardly projecting dog depressing member 64 (FIGS. 3 and 4) and a forwardly projecting dog positioning member 65 on the front trolley of each carrier. When a carrier overtakes a preceding stopped carrier the dog positioning member 65 is engaged and moved by the dog depressing member 64 with the result that the driving dog 26, which is slidably mounted in the trolley body, is depressed to a non-driving position relative to a pusher 62.

This releasing dog trolley or accumulation feature may also be employed where it is desired to merely store a group of carriers in closely spaced side-by-side relation, and in addition, serves to control the return of carriers from side-by-side to end-to-end relation. A suitable wayside dog depressing member 66, moved by a fluid pressure cylinder 67, may be installed near the end of the double track section as shown in FIG. 2 so as to cause a leading carrier and all following ones which overtake it to be brought to a halt and accumulated in a bank. Each time the dog depressing member 66 is moved to nonobstructing position, the driving dog of the leading carrier will return to driving position for engagement by the next advancing pusher 62 of the power line 58. An auxiliary feeder line 70, provided with pushers 71, is mounted adjacent the rear trolley track 53, and the rear trolley 20 of each carrier is provided with a driving dog 72 (FIG. 3) which is engaged by one of the pushers 71 after the driving dog 26 on the leading trolley has lost engagement with a pusher 62 of the power line 58, to propel the carrier through the junction 74 and into a position where the driving dog 26 on the front trolley will be picked up by an advancing pusher 76 of the power line 78. Carriers can be driven in side-by-side relation either from the front or the rear trolley because the spacing between front and rear trolley tracks 52 and 53 is less than the distance between front and rear trolleys, causing the carriers to traverse the front and rear tracks in oblique relation thereto.

Banks of double track sections can readily be employed in a single conveyor system for the processing or storage of loads by employing double switches at the entrance and end of each such section and some form of dispatch or selective delivery system for controlling their operation at the entrance end. Since such devices and controls for regulating the movement of carriers to and from branch lines of a power and free conveyor system are well known they have not been included in the present disclosure.

While preferred embodiments have been described above in detail, it will be understood that numerous modifications might be resorted to without departing from the scope of the invention as defined in the following claims.

I claim:

1. In a conveyor system in which load carriers are each supported from a main track by spaced front and rear trolleys for travel in end-to-end relation propelled by pushers of a main power line means for permitting the carriers to travel along a portion of the system in side-by-side relation comprising separate front trolley and rear trolley tracks extending from the main track in parallel spaced relation along said portion of the system, a switch zone at the entrance to said portion of the system, the switch zone including means for diverting the front trolley of a carrier onto the front trolley track and the rear trolley of the same carrier onto the rear trolley track, the transverse spacing between said separate front and rear trolley tracks along said portion of the system being substantially less than the distance between the front and rear trolleys of a carrier whereby a carrier traverses said portion of the system in oblique relation to the front and rear trolley tracks thereof, and means for propelling carriers along said portion of the system in side-by-side relation, said propelling means including a power line having a plurality of pushers mounted adjacent one of said front and rear trolley tracks and a driving dog on the corresponding one of said front and rear trolleys engageable by one of said pushers.

2. A conveyor system according to claim 1 wherein said means for propelling carriers along said portion of the system includes pusher means for sequentially engaging the front and the rear trolleys of a carrier.

3. A conveyor system according to claim 1 further characterized by means for accumulating a plurality of carriers along said portion of the system in closely spaced side-by-side relation whereby a relatively large number of carriers can be stored or processed along said portion of the system for a given length thereof.

References Cited by the Examiner

UNITED STATES PATENTS

| 1,443,382 | 1/23 | Rapier | 104—98 |
| 1,752,026 | 3/30 | Phillips | 104—98X |
| 1,865,788 | 7/32 | Raymond | 104—91 |
| 2,116,430 | 5/38 | Gordon | 104—91X |
| 2,885,969 | 5/59 | Kay et al. | 104—172 |
| 2,975,727 | 3/61 | Kokoras | 104—91 |
| 2,987,012 | 6/61 | King | 104—172 |

FOREIGN PATENTS

| 141,914 | 4/20 | Great Britain. |

LEO QUACKENBUSH, *Primary Examiner.*